(No Model.)
L. NOBLE.
CAMERA STAND.
No. 560,525. Patented May 19, 1896.
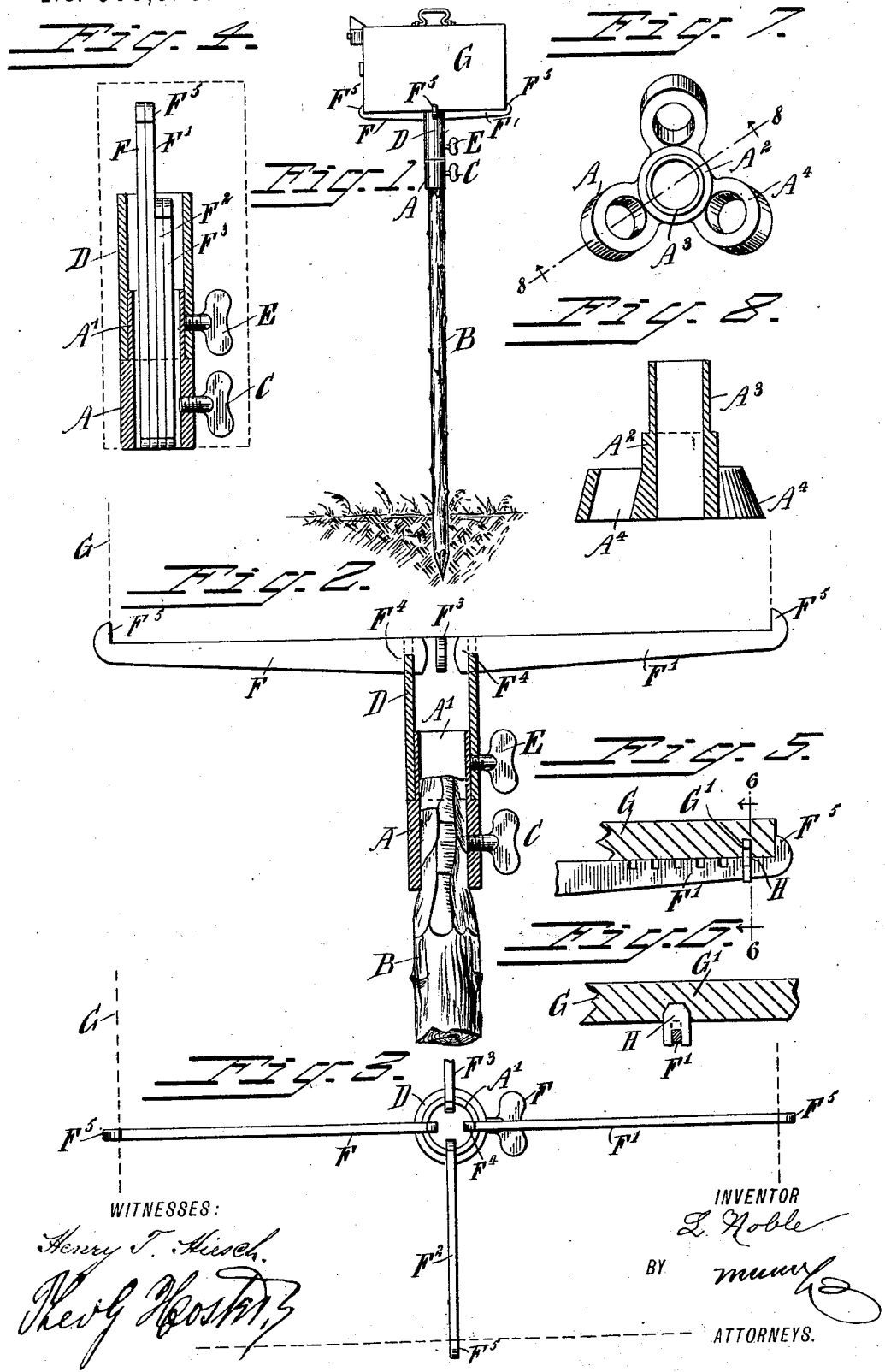
WITNESSES:
Henry T. Hirsch.
Theo G Hoskins
INVENTOR
L. Noble
BY Munn
ATTORNEYS.

UNITED STATES PATENT OFFICE.

LAFAYETTE NOBLE, OF HAVERHILL, MASSACHUSETTS.

CAMERA-STAND.

SPECIFICATION forming part of Letters Patent No. 560,525, dated May 19, 1896.

Application filed March 19, 1896. Serial No. 583,915. (No model.)

*To all whom it may concern:*

Be it known that I, LAFAYETTE NOBLE, of Haverhill, in the county of Essex and State of Massachusetts, have invented a new and Improved Camera-Stand, of which the following is a full, clear, and exact description.

The object of the invention is to provide a new and improved camera stand or support which is simple and durable in construction, adapted to be folded up into a small space, and arranged to be readily set up to form a tripod for securely holding the camera in place and at the same time permitting of turning the camera in the desired direction.

The invention consists principally of a ferrule adapted to be attached to a support, a cylinder mounted on said ferrule, and a series of removable arms adapted to be hooked upon the upper end of said cylinder to form a base for the camera to rest on.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a side elevation of the improvement as applied. Fig. 2 is an enlarged sectional side elevation of the improvement. Fig. 3 is a plan view of the same. Fig. 4 is a sectional side elevation of the same as folded up. Fig. 5 is an enlarged sectional side elevation of part of one of the supporting-arms and the bottom of the camera-casing. Fig. 6 is a transverse section of the same on the line 6 6 of Fig. 5. Fig. 7 is a plan view of a modified form of ferrule, and Fig. 8 is a sectional side elevation of the same on the line 8 8 of Fig. 7.

The improved camera-stand is provided with a ferrule A, adapted to receive in its lower end a stick B to be driven into the ground, as illustrated in Fig. 1. The ferrule A is adapted to be fastened on the upper end of the stick B by a suitable thumb-screw C, and the upper end of said ferrule is reduced, as at A', to form a bearing for a cylinder D, mounted to turn on said reduced end and adapted to be fastened thereon by a thumb-screw E. The upper end of the cylinder D is provided with a series of notches adapted to receive the inner or hook ends $F^4$ of a series of arms F F' $F^2$ $F^3$, which when attached to said cylinder D extend with their upper surfaces in the same horizontal plane to form a base for the camera G to rest on.

The outer ends of the arms F F' $F^2$ $F^3$ are provided with upwardly-extending lugs $F^5$, adapted to engage the sides and ends of the camera G, so as to securely hold the latter in place, it being understood that the arms F F' are arranged opposite each other in a longitudinal direction, and the arms $F^2$ $F^3$ are arranged opposite each other and extend in a transverse direction and preferably at right angles to the arms F F'. The distance between the inner faces of the lugs or projections $F^5$ corresponds to the length of the camera-casing, and the distance between the lugs $F^5$ and the arms $F^2$ $F^3$ corresponds to the width of the camera-casing, so that when the latter is placed on said arms the camera is not liable to move out of place on the base formed by said arms. It will, however, be seen that when the thumb-screw E is loosened the cylinder D with the said arms F, F', $F^2$, and $F^3$ and the camera G can be turned on the upper end A' of the ferrule A to bring the objective of the camera in the desired position for the picture to be taken.

If desired, each of the arms is preferably formed near its outer end with a series of notches, one of which is adapted to be engaged by the lower forked end of a block H, extending a suitable distance above the top surface of said arm, so as to fit into a recess G' in the bottom of the casing of the camera G. By this arrangement lateral as well as longitudinal movement of the camera is entirely prevented and different size cameras can be held securely in place on the same stand.

The ferrule A, instead of being held on a stick to form a one-legged support, may be constructed in the manner shown in Figs. 7 and 8, so as to form a tripod. In this event the ferrule $A^2$ is provided with a reduced end $A^3$ and with a number of angular apertured flanges $A^4$, each adapted to receive a stick to form a leg.

When the stand is not in use, the several arms F F' $F^2$ $F^3$ can be readily unhooked from the upper end of the cylinder D, and then the said arms can be slipped into the ferrule, as illustrated in Fig. 4. Thus it will be seen that the several devices can be conveniently folded up into a comparatively small space.

Having thus fully described my invention, I claim as new and desire to secure by Letters Patent—

1. A camera-stand comprising a ferrule, a cylinder removably connected with the ferrule, and arms detachably connected to the cylinder, substantially as shown and described.

2. A camera-stand, comprising a ferrule, a cylinder removably connected with the ferrule, and arms of differing length, detachably connected to the cylinder, substantially as shown and described.

3. A camera-stand, comprising a ferrule, a cylinder removably connected with the ferrule, and arms of differing length detachably connected to the cylinder, and formed with lugs at their outer ends, substantially as shown and described.

4. A camera-stand, comprising a ferrule, a cylinder removably connected with the ferrule, and arms of differing length detachably connected to the cylinder, and formed with lugs at their outer ends, one or more of said arms being provided with notches adapted to receive a stop connected with the base of the camera, substantially as shown and described.

5. A camera-stand comprising a ferrule adapted to be attached to a support, a cylinder mounted to turn on said ferrule and adapted to be secured thereto, and a series of arms removably connected with the upper end of said cylinder, to form a base for the camera to rest on, substantially as shown and described.

6. A camera-stand, comprising a ferrule adapted to be attached to a support and formed in its upper portion with a reduced end forming a bearing, a cylinder mounted to turn on said reduced end, and a series of arms removably connected with the upper end of said cylinder, to form a base for the camera to rest on, substantially as shown and described.

7. A camera-stand, comprising a ferrule adapted to be attached to a support and formed in its upper portion with a reduced end forming a bearing, a cylinder mounted to turn on said reduced end, and a series of arms removably connected with the upper end of said cylinder, to form a base for the camera to rest on, said arms being provided at their outer end with upwardly-extending lugs or projections adapted to engage the sides of the camera-casing, substantially as shown and described.

8. A camera-stand, comprising a ferrule adapted to be attached to a support and formed in its upper portion with a reduced end forming a bearing, a cylinder mounted to turn on said reduced end, a series of arms removably connected with the upper end of said cylinder, to form a base for the camera to rest on, and a set-screw for fastening said cylinder in place on the reduced end of the ferrule, substantially as shown and described.

9. A camera-stand, comprising a ferrule adapted to be attached to a support and formed in its upper portion with a reduced end forming a bearing, a cylinder mounted to turn on said reduced end, and a series of arms removably connected with the upper end of said cylinder, to form a base for the camera to rest on, said arms being provided at their outer ends with upwardly-extending lugs or projections adapted to engage the sides and ends of the camera-casing, the said arms being also provided with notches adapted to receive a removable block, said block being adapted to engage a recess in the under side of the camera-casing, substantially as shown and described.

LAFAYETTE NOBLE.

Witnesses:
CHAS. H. FRENCH,
CHAS. J. HALPEN.